United States Patent Office 3,218,884
Patented Nov. 23, 1965

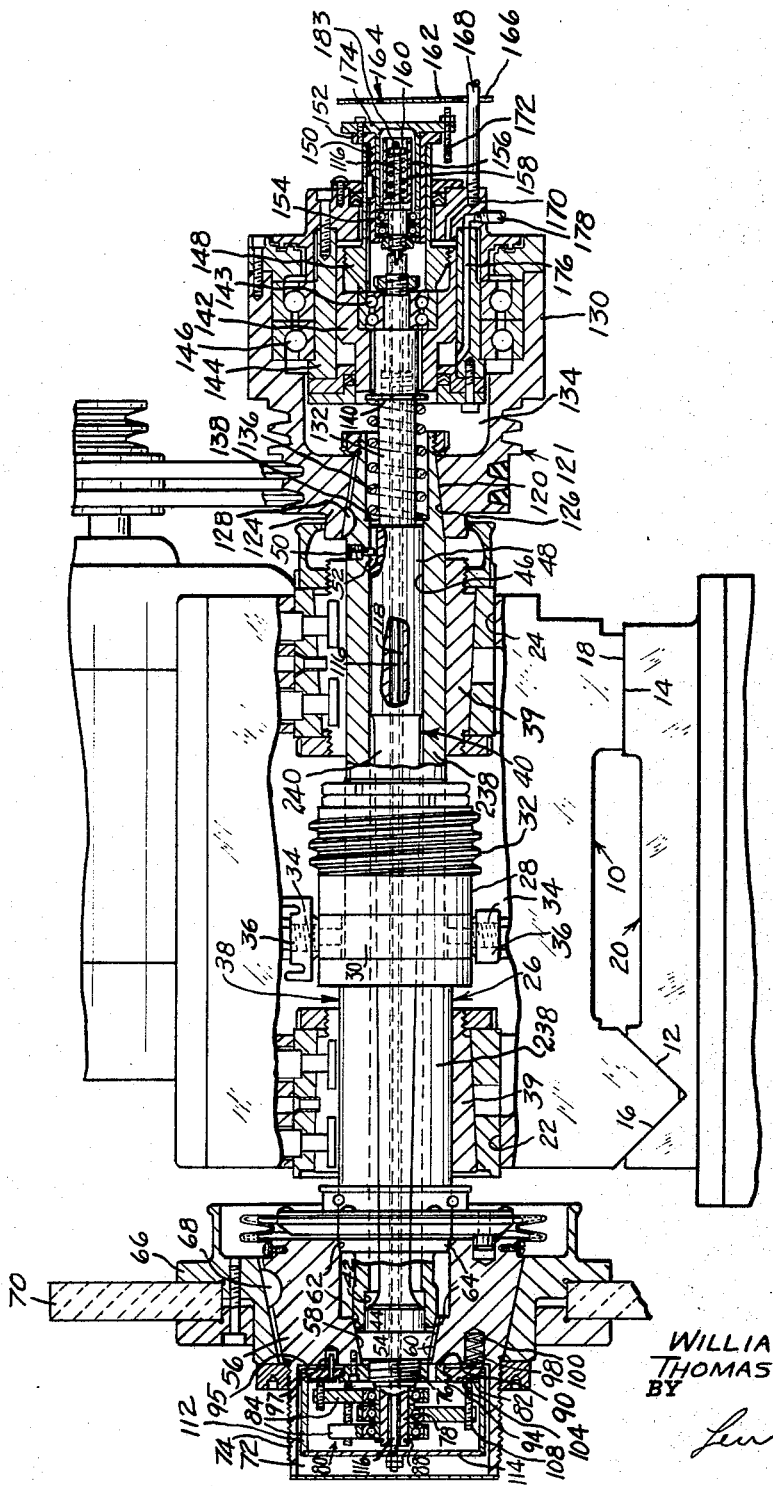

3,218,884
DYNAMICALLY ACTUATED BALANCING MEANS
William R. Backer, Holden, and Thomas F. Stevens, Shrewsbury, Mass., assignors to Norton Company, Worcester, Mass., a corporation of Massachusetts
Filed Dec. 13, 1961, Ser. No. 158,958
12 Claims. (Cl. 74—573)

This invention relates to dynamically actuated balancing means of the kind described in the copending application of Backer et al., Serial No. 44,382, filed July 21, 1960, now Patent No. 3,107,550, wherein provision is made for automatically, periodically balancing a rotating object, such as a grinding wheel, on its driving spindle to insure precision operation without having to stop or dismantle the machine.

In the aforesaid machine, balancing is achieved automatically, in contrast to prior methods, by supporting the spindle assembly in fixed bearings (the prior art teaches releasing one of the bearings), supporting the rotating object on the spindle assembly for axial movement longitudinally of the assembly from a first position in which it is held concentric with the axis of the assembly to a second position to permit deviation, relative to the axis of the assembly, and providing balancing means which is held immobilized in the first position and released so as to be effective in the second position. Specifically, the assembly, as shown therein is constituted by a rotatably mounted, axially relatively fixed outer spindle portion and an inner spindle portion disposed centrally of the outer portion for rotation therewith and movement lengthwise thereof, the inner spindle portion supporting the rotating object and the balancing means and being operable, by axial movement, sequentially to release one end of the inner spindle portion for radial deviation from the axis of rotation and to release the balancing means for a balancing operation.

The balancing means which is in the form of weights rotatably supported on the inner spindle portion is held immobilized prior to relative axial movement of the inner spindle portion by a locking ring supported on the inner spindle portion and held yieldably engaged with the balancing weights. To effect release of the balancing weights each of a plurality of symmetrically disposed, slender, adjustable cables is connected at one end to the locking ring and at its other end to the outer axially relatively fixed portion of the spindle assembly, so as to actuate the locking ring during the latter part of the axial movement of the inner spindle portion to permit disengagement of the weights from the locking ring.

The foregoing actuating means for the locking means requires an excessive amount of space hence limiting its use to wheels having relatively large center holes, is designed to operate most efficiently with a wheel of predetermined weight and hence is subject to breakage and loss of sensitivity when used with a wheel of substantially different weight, is adjusted by multiple coordinated adjustments of the lengths of the several cables, is difficult to make secure, and cannot be adjusted with the spindle assembly rotating.

In contrast to the prior art teaching described above, the principal objects of this invention are therefore to provide an improved means for actuating and more particularly for releasing the locking means which is compact and hence does not require that the wheel have a disproportionately large center hole; which is not influenced by the weight of the wheel and hence may be used with wheels of different weight without sacrifice of sensitivity or danger of failure; which extends through the inner spindle portion concentrically thereof; which embodies only single means for adjustment; and which can be adjusted at a place remote from the wheel while the spindle assembly is rotating.

The foregoing objects are obtained herein by means of an actuator element mounted adjacent the locking ring at the side next to the balancing means in concentric relation thereto, supported for axial movement both with the inner spindle portion and relative thereto by a single actuating rod disposed within and extending axially through a passage lengthwise of the inner spindle portion. A limit stop at the end of the rod remote from the actuator element constrains movement of the rod and hence the actuator element during the latter part of the movement of the spindle so as to effect disengagement of the balancing means and locking ring. The rod passes through and extends beyond both ends of the inner spindle portion and there is adjusting means at its remote end for effecting adjustment of the rod lengthwise of the inner spindle portion while the spindle assembly is rotating.

The invention will now be described in greater detail with reference to the accompanying drawing which is an elevation, partly in section, longitudinally of the spindle assembly of a conventional grinding machine.

Referring to the drawing, there is shown a wheel slide 10 having V-shaped and flat ways 12 and 14 for sliding engagement with corresponding ways 16 and 18 on a supporting base 20. The wheel slide 10 contains spaced circular, axially aligned bearing openings 22 and 24 in which are fitted bearings 39 which rotatably support a spindle assembly 26. The spindle assembly 26 is movable axially in its bearings 39, as is conventional in this type of machine, so that the wheel may be oscillated relative to the work and, to this end, has fixed to it a sleeve 28 provided with an annular groove containing a non-rotatable annular ring 30 and on its surface threads 32 constituting a worm. A pair of radially disposed pins 34, fixed to the arms 36 of a forked lever, provide for effecting oscillation. Reciprocation of the forked lever is effected through linkage (not shown) driven by a cam or eccentric (not shown), in turn rotated by a worm wheel (not shown) which meshes with the worm threads 32 on the sleeve 28 so that rotation of the spindle assembly 26 produces oscillation of the arms 36 and hence oscillation of the spindle assembly.

The spindle assembly 26 has a rigid, elongate, hollow outer spindle portion generally designated by reference numeral 38 including a sleeve 238 which is rotatably supported in spaced adjustable bearings 39 mounted in the openings 22 and 24 with its axis in a horizontal position and with its opposite ends projecting from the bearings. The sleeve 238 of outer spindle portion 38 is constrained by the bearings to turn about a fixed, predetermined horizontal axis and is adapted to be oscillated axially in the bearings, as described above, within limits imposed by the stroke of the fork.

As illustrated in the drawing, the outer spindle portion 38 of the spindle assembly 26 includes external tapered bearing elements 62—62 and internal cylindrical bearing element 42 concentric thereof at the left hand end of sleeve 238 and an internal cylindrical bearing element 46 adjacent the right hand end of the sleeve 238, all disposed for coaction with complementary bearing surfaces on the inner spindle portion generally designated by reference numeral 40. In addition, the sleeve 238 of the outer spindle portion 38 supports a driven sheave 121 fixedly secured to the sleeve 238 by suitable connecting means including the key 128 cooperating with interfitted tapered surfaces and a lock nut, said sheave 121 including a hub portion 124 and an annular projection 130 therefrom forming a chamber 134 housing elements of the mechanism, described in detail further below, operatively interconnecting the outer spindle portion 38 and the inner spindle portion 40.

The spindle assembly 26 also has an inner spindle portion 40 which includes an elongated hollow spring rod 240 with an elongated intermediate section tapered along its length as illustrated in the drawing. As illustrated, the inner spindle portion 40 also includes a circular hub 56 fixedly secured to the left hand end of the hollow spring rod 240 and the means interconnecting the rod 240 and the hub 56 including the key 60 and the lock nut 90 cooperating with interfitting tapered surfaces on the rod 240 and the hub 56. The hub 56 is provided with internal tapered bearing elements 64—64 disposed for precision engagement with the elements 62—62 of the outer spindle portion 38, and the hollow ring rod 240 includes an external cylindrical centering bearing element 44 at its left hand end for engagement with the internal bearing element 42 of the outer spindle portion 38 and an elongated external cylindrical bearing element 48 adjacent its right hand end for engagement with the internal bearing element 46 of the outer spindle portion 38.

The inner spindle portion 40 is operably connected to the outer spindle portion 38 for rotation therewith by a key 50 extending from sleeve 238 of the outer spindle portion 38 into a slot 52 in the bearing element 48 of spring rod 240 of the inner spindle portion 40, the slot having an axial length such that the inner spindle portion 40 may be moved axially within the outer spindle portion 38 so as to disengage the bearing elements 44 and 64—64 at the left end of the inner spindle portion 40 from the bearing elements 42 and 62—62 on the outer spindle portion 38. The hollow spring rod 240 of inner spindle portion 40 is reduced in diameter between the bearing elements 44 and 48 so as to afford an annular clearance between the rod 240 and the sleeve 238 of outer spindle portion 38. In addition, the reduced portion tapers from a maximum diameter at the bearing element 48 to a minimum adjacent the bearing element 44 to accommodate radial deflection of the wheel 70 when bearing elements 44 and 64—64 are disengaged from bearing elements 42 and 62—62. Hence, when the bearing elements 44 and 64—64 are disengaged from the bearing elements 42 and 62—62, the inner spindle portion 40 is supported only at its right-hand end and is free to flex with respect to the fixed axis of the outer spindle portion 38.

The projecting portion of the inner spindle portion 40, at the left-hand end as seen in the drawing, has a conical support 54 of larger diameter than the bearing element 44, upon which there is mounted a circular hub 56 having a central conical opening 58 engaged with the conical support 54 and non-rotatably secured thereto by a key 60. The hub 56 extends axially to the right and left of the support 54, the portion at the right extending over the end of the sleeve 238 of outer spindle portion 38 and, for the purpose of insuring concentricity and rigidity, the bearing elements 62—62, which mate with bearing elements 64—64, are on the axially extending portion of the hub 56. The elements 62—62 and 64—64 are disengaged by the initial movement of the inner spindle portion 40 axially to the left as shown in the drawing and continued movement of the spindle portion 40 to the left is effective to disengage the bearing elements 42 and 44.

The hub 56 has mounted on it an adapter 66 which is non-rotatably secured thereto by a key 68, by means of which a grinding wheel 70 of suitable thickness may be fastened to the hub 56.

The hollow spring rod 240 of the inner spindle portion 40 projects through the conical bearing opening 58 in the hub 56 into a circular chamber 72 constituted by an annular extension 74 of the hub and has on it an axially aligned threaded support 76 and bearing support 78. A lock nut 90 engages the threads on the support 76 to lock the hub 56 to the hollow spring rod 240 of the inner spindle portion 40. Rotation of the lock nut 90 relative to the rod 240 of inner spindle portion 40, after it has been screwed onto the support 76, is prevented by a pin or a machine screw, as illustrated, driven into the hub 56. The chamber 72 provides a housing for a balancing assembly 80 which is mounted on the bearing support 78 and a locking plate or ring 82 adapted to hold the balancing assembly immobilized under normal operating conditions. The balancing assembly 80 as illustrated comprises three weights 84 rotatably supported on the bearing support 78 and constrained to move with the spindle as the latter is moved axially by a shoulder at the right end of the bearing support 78 and a retaining ring 88 at the left end of the bearing support 78.

The lock nut 90 has a radial flange 94 at the left side and the locking ring 82, which is of lesser axial thickness than the nut, is supported thereon between the flange 94 and the face of the hub 56 in engagement with a plurality of coiled springs 98, situated in recesses 100 formed in the face of the hub 56, on a circle concentric of the axis of the hub 56 and under compression so as to hold the locking ring 82 engaged with the flange 94. A clearance 95 thus exists between the locking ring 82 and the face of the hub 56. A pin 97 projects from the locking ring 82 into a recess in the hub 56 and hence causes it to turn with the hub along with the locking nut 90. The locking ring 82 has on its face a plurality of equally spaced radial groove 104 for maintaining the weights 84 in fixed angular positions relative to the inner spindle portion 40.

Each of the weights 84 has an adjustable screw 108 threaded through it parallel to the axis of the spindle assembly 26 on a radius corresponding to the distance from the axis of the spindle to the mid point of the grooves 104. The end of each screw has a conical tip for engagement with the grooves 104. When the bearings at both ends of the inner spindle portion 40 are engaged with the corresponding bearings on the outer spindle portion 38, the conical tips of the screws 108 are held engaged with the grooves 104 of the locking ring 82 and since the locking ring 82 is fixed angularly to the hub 56, the weights 84 are prevented from rotating relative to the spindle assembly 26.

Release of the weights 84 from the locking ring 82 is effected by axial movement of the inner spindle portion 40 sufficient first to disengage the bearing elements 42 and 44 and then to move the conical tips of the screws 108 away from the grooves 104 in locking ring 82 after the axial movement of the locking ring 82 with the inner spindle portion 40 is terminated in the manner described below. Movement of the locking ring 82 axially relative to the inner spindle portion 40 is produced by an actuator element comprising a sleeve 112 disposed in the chamber 72 with one end engaged with the peripheral edge of the locking ring 82 and the other end supported by a disc 114 connected at its center to a rod 116 which is disposed within and extends through an axial passage 118 lengthwise of the inner spindle portion 40. The axial displacement of the rod 116 with the inner spindle portion 40 is limited by the engagement of an adjustable screw 172 with the end cap on the cylinder 144 in the manner described further below which occurs before the hollow piston 142 bottoms at the left hand end of the cylinder 144.

Rotation of the spindle assembly, release of the spindle for the purpose of balancing, and release of the weights for effecting balancing are effected at the right-hand end of the spindle assembly 26. As illustrated, the right-hand end of the sleeve 138 of the outer spindle portion 38 is provided with a conical bearing 120 upon which there is mounted a sheave 121 having a hub portion 124 containing a conical opening 126, relatively non-rotatably secured to the conical bearing 120 by a key 128. Rotation of the sheave 121 therefore imparts rotation to the spindle assembly 26. The sheave 121 has an annular projection 130 extending axially from the hub providing a chamber 134 into which protrudes a reduced extension 132 of the inner spindle portion 40. The chamber 134 provides support for fluid-operable means for effecting relative axial movement of the inner spindle portion 40 in a direction from right to left against the resistance to compression of a coiled spring 136, disposed about the extension 132, with one end engaged with an annular shoulder 138 on the outer spindle portion 38 and a nut 140 on the extension 132, which normally operates to hold the spindle displaced toward the right with the bearings 46, 48 and 62, 64 fully engaged. The fluid-operable means, consisting of coacting non-rotatable elements supported within the chamber 134 rotatable with the spindle assembly and the sheave 121, comprises a hollow piston 142 mounted on a bearing assembly 143 in contact with the nut 140 on the extension 132 within a cylinder 144 mounted in the chamber 134 in bearing assemblies 146. The piston 142 has internally screwed to its right-hand end a sleeve 148 which extends through the end cap of the cylinder 144, forming a hollow piston rod, into which projects the right-hand end of the rod 116. A sleeve 150 is slidably keyed to and mounted in the open end of the sleeve 148, and has on it a radial flange 152 which normally engages the end of the sleeve 148. The sleeve 150 supports internally thereof a bearing assembly 154 which, in turn, rotatably supports a hollow shaft 156 into which the end of the rod 116 extends. The left hand end of the hollow shaft 156 is provided with an extension reduced in cross section and including a projection therefrom disposed as shown in interfitting engagement with a mating slot in the right-hand end of the extension 132 of the inner spindle portion 40, interconnecting the extension 132 and the hollow shaft 156 so that they rotate together.

A coiled compression ring 158 is disposed within the hollow shaft 156 and about the end of the rod 116 with one end bearing against the left end of the hollow shaft 156 and the other end bearing against a collar or head 160 secured to the end of the rod 116. The cushioning spring 158 is biased by a stop pin 183 engaging the head 160 so that the springs 98 can be compressed an amount equal to the space 95 between the locking ring 82 and the hub 56 without further deflection of the spring 158.

The cylinder 144 is prevented from rotating about the axis of the spindle assembly by a suitable constraining means interconnecting the cylinder 144 and the wheel slide 10 to preclude relative angular movement while permitting relative movement axially of the spindle assembly to accommodate spindle reciprocation in the conventional manner as described above. For simplicity in the drawing, this restaining means is illustrated as consisting of the rigid nipple 168 threaded into a port 170 in the end of the cylinder 144 and passing through a notched opening 166 in the edge of the portion 162 illustrated of a conventional wheel guard assembly 164 fixedly secured to the wheel slide in the conventional manner. In practice, this restraining means will more probably consist of coacting elements such as the radially extending cylinder positioning lever secured to the end of the cylinder and the slotted bracket secured fixedly to the wheel slide illustrated and described in copending application Serial No. 44,382 referred to above.

In operation, when fluid is allowed to exhaust from the left hand end of the cylinder 144 and pressure fluid is supplied to the right-hand end of the piston 142, the piston 142 is moved toward the left thereby moving the inner spindle portion 40 toward the left, for example about nine-sixteenths of an inch, sequentially disengaging the precision conical bearing surfaces 62—62 and 64—64 and then the cylindrical centering bearings 42, 44 to release the left hand end of the inner spindle portion 40 from the left-hand end of the outer spindle portion 38. The rod 116 is held stationary relative to and hence moves axially with the inner spindle portion 40 during this initial movement, so that the locking ring 82 remains engaged with the tips of the locking screws 108 on the weights 84. Thus, the weights remain in fixed angular relation to and rotate in unison with the spindle assembly even though the inner spindle portion 40 has been released from coaxial engagement with the outer spindle portion 38.

The sleeve 148, of course, moves toward the left with the inner spindle portion 40 carrying with it the sleeve 150 and shaft 156. However, at the end of the aforesaid distance an adjustable screw 172 in a member 174 attached to the flange 152 comes into engagement with the end cap on the cylinder 144, preventing further movement of the sleeve 150 and shaft 156. Continued movement of the piston 142 accordingly moves the sleeve 148 relative to the sleeve 150, the shaft 156 and the spring 158 which are now held stationary. The spring 158 resists movement of the rod 116 and hence as the inner spindle portion 40 continues to move axially, relative to the rod, the locking ring 82 is held stationary and the weights 84 and their screws 108 are moved out of engagement with the grooves 104 in the locking ring 82 so as to release the weights 84 for their balancing function. When fluid pressure is supplied through a port 178 to the left hand side of the piston 142 and fluid exhausts from the right hand side, the piston moves toward the right, which results in re-engagement of the locking screws 108 with the grooves 104 in the locking ring 82 thereby fixing the angular position of the weights 84 relative to the spindle assembly before the spindle bearing element 44 is re-engaged with the bearing element 42 in the outer spindle portion 38 in order to position the inner spindle portion 40 and the outer spindle portion in substantially coaxial alignment.

Pressure fluid is supplied to the right hand side of cylinder 144 through the nipple 168 and to the left hand side through a nipple 178 which are connected to a suitable source of pressure fluid. The details of the pressure system and its control are not illustrated herein since they are not necessary to a complete understanding of the construction of the spindle assembly and balancing means associated therewith.

It should be understood that the present disclosure is for the purpose of illustration only and that this invention includes all modifications and equivalents falling within the scope of the appended claims.

We claim:

1. In a machine tool, a spindle assembly supported for rotation about a predetermined axis, comprising a first portion connected to a driving element, a second portion rotatable with the first portion and movable axially thereof, said second portion having an axial passage lengthwise thereof and having a rotatable tool fixed thereto, restraining means on the respective portions operable, when engaged, to maintain the portions coaxial and, when disengaged, to release said portions, said restraining means being engageable and disengageable by relative axial movement of the respective portions, balancing means on the second portion held locked thereto for rotation with the spindle assembly when the restraining means are engaged, and actuating means disposed in the passage in said second portion in coaxial relation thereto, said actuating means being movable in unison with said second portion, during the initial relative axial movement of the latter to release said second portion from said restraining means and then relative to the second portion to unlock the balancing means to permit rotation thereof relative to the second portion while the latter is released.

2. A machine tool according to claim 1, wherein there is stop means connected to the end of the actuating means remote from the balancing means and disposed externally of said spindle assembly adjustable lengthwise of the actuating means during rotation of the spindle assembly to vary the point at which axial movement of said actuating means in unison with said second portion is terminated to unlock the balancing means.

3. In a machine tool, a spindle assembly supported for rotation about a predetermined axis, comprising a first portion connected to a driving element, a second portion rotatable with the first portion and movable axially thereof, said second portion having an axial passage therethrough and having a rotatable tool fixed thereto, restraining means on the respective portions operable, when engaged, to maintain the portions coaxial and, when disengaged, to release the portions, said restraining means being engageable and disengageable by relative axial movement of the portions, balancing means rotatably mounted on the second portion, a locking ring mounted on the second portion adjacent the balancing means, said locking ring being movable with the second portion and relative thereto, means yieldingly holding the locking ring engaged with the balancing means during normal operating conditions, and actuating means operable to limit movement of the locking ring with the second portion during the relative axial movement of the respective portions so that continued axial movement of the second portion and the balancing means rotatably mounted thereon relative to the first portion disengages the balancing means from the locking ring, said actuating means including an elongated tension member disposed in the passage in the second portion in coaxial relation thereto and constrained with the locking ring for movement with the second portion during the initial relative axial movement of the portions and also including a limit stop secured to the tension member operable during the latter part of the relative axial movement of the portions to prevent further axial movement of the tension member and the locking ring actuated thereby relative to the first portion.

4. A machine tool according to claim 3, wherein said limit stop is connected to said tension member remote from said balancing means and is disposed externally of said spindle assembly, and wherein said limit stop includes means adjustable lengthwise relative to said tension member while said spindle assembly is rotating.

5. In a machine tool, a spindle assembly supported for rotation about a predetermined axis, comprising a first portion connected to a driving element, a second portion rotatable with the first portion and movable axially thereof, said second portion having an axial passage lengthwise thereof and having a rotatable tool fixed thereto, restraining means on the respective portions operable, when engaged, to maintain the portions concentric and, when disengaged, to release said portions, said restraining means being engageable and disengageable by relative axial movement of the portions, balancing means rotatably mounted on the second portion, a locking ring mounted on the second portion adjacent the balancing means, said locking ring being movable with the second portion and relative thereto, means yieldingly holding the locking ring engaged with the balancing means during normal operating conditions, and means operable to limit movement of the locking ring with the second portion as the latter is moved axially to effect its release comprising an actuator element having engagement with the locking ring concentrically with respect to the axis of the second portion at the side next to the balancing means, a rod extending therefrom through the passage in coaxial relation to the axis of the second portion and connected to constrain the actuator element for movement with the second portion during the initial part of the axial movement of the latter to effect its release, and a limit stop on the rod operable during the latter part of the axial movement to constrain the rod and thence the actuator element from further movement with the second portion.

6. In a machine tool, a spindle assembly supported for rotation about a predetermined axis, comprising a first spindle portion connected to a driving element, a second spindle portion rotatable with the first spindle portion and movable axially thereof, said second spindle portion having an axial passage lengthwise thereof and having a rotatable tool fixed thereto, restraining means on the respective spindle portions operable, when engaged, to maintain the spindle portions concentric and, when disengaged, to release said spindle portions, said restraining means being engageable and disengageable by relative axial movement of the spindle portions, balancing means rotatably mounted on the second spindle portion, a locking ring mounted on the second spindle portion adjacent the balancing means, said locking ring being movable both with the second spindle portion and relative thereto, means yieldingly holding the locking ring engaged with the balancing means under operating conditions, and means operable to limit movement of the locking ring with the second spindle portion as the latter is moved axially to effect its release comprising an annular actuator situated adjacent the side of the locking ring engaged with the balancing means in concentric relation to the locking ring, a rod coupled to the actuator, said rod extending through the passage in the second spindle portion in coaxial relation thereto and constraining the actuator for movement with the second spindle portion during the initial axial movement of said second spindle portion to effect release of said second spindle portion, and a limit stop on the rod operable to limit its movement and hence preclude movement of the locking ring with the second spindle portion during the latter part of its axial movement.

7. In a machine tool, an elongated spindle assembly supported for rotation about a predetermined axis, comprising a first portion connected to a driving element, a resilient second portion supported by and rotatable with the first portion and movable axially thereof, said second portion having a central passage lengthwise thereof and having a rotatable tool fixed thereto, restraining means on the respective portions operable, when engaged, to maintain the portions concentric and, when disengaged, to release the ends of said portions adjacent to a rotatable tool supported thereby for radial relative displacement, said restraining means being engageable and disengageable by relative axial movement of the portions, balancing means rotatably mounted on the second portion adjacent to a rotatable tool supported thereby, a locking ring mounted on the second portion adjacent the balancing means, said locking ring being movable both with the second portion and relative thereto, means yieldingly holding the locking ring engaged with the balancing means under operating conditions, and constraining means operable to limit movement of the locking ring with the second portion as the latter is moved axially to effect its release, said constraining means comprising an actuator element disposed concentrically about the balancing means having an annular shoulder adjacent the side of the locking ring next to the balancing means, a rod connected to the center of said actuator element and extending therefrom through the passage in the second portion, said rod constraining the actuator element for movement with the second portion during initial axial movement thereof, and means on the rod for limiting its axial movement and hence preventing movement of the locking ring with the second portion during the latter part of the axial movement of the second portion.

8. Apparatus according to claim 7, wherein the rod and the actuator element connected thereof are movable radially with the second portion when the latter is released for balancing.

9. Apparatus according to claim 7, wherein the rod supports the actuator element concentric to and parallel with the locking ring during radial displacement of the second portion relative to the first portion.

10. Apparatus according to claim 7, wherein there is means yieldably operating on the rod to maintain the actuator element in engagement with the locking ring under operating conditions.

11. The combination comprising a spindle assembly supported for rotation about a predetermined axis including a first portion connected to a driving element, a second portion with a central passage therethrough supported concentrically within and rotatable with the first portion and movable axially thereof, said second portion having a rotatable element fixed thereto, restraining means on the respective portions operable, when engaged, to maintain the portions coaxial and, when disengaged, to release the ends of said portions adjacent to a rotatable element supported thereby for radial relative displacement, said restraining means being engageable and disengageable by relative axial movement of the portions, a plurality of weights rotatably mounted on the second portion for movement axially therewith, a locking ring connected to the second portion for rotation therewith, said locking ring being movable axially on the second portion relative to the weights, a locking ring engaging member on each weight disposed parallel to the axis of the second portion with an end adjacent the locking ring, spring means on the second portion yieldably holding the locking ring engaged with the ends of the locking ring engaging members so that the weights rotate with the second portion under normal operating conditions, and means operable to limit movement of the locking ring with the second portion as the latter is moved axially to effect its release comprising an actuator situated adjacent to the side of the locking ring, a rod disposed in the central passage of the second portion with its ends extending beyond both ends thereof, said actuator being secured to one end of the rod and in concentric relation to the locking ring, and a limit stop fixed to the other end of the rod, operable by contact with an axially relatively fixed part of the spindle assembly as the second portion is moved axially of the spindle assembly to constrain the rod and hence the locking ring so that continued axial movement of the second portion disengages the locking ring engaging members from the locking ring to release the weights for a balancing operation.

12. The combination described in claim 11, wherein said limit stop is disposed externally of said spindle assembly and includes means adjustable lengthwise of said rod while the spindle assembly is rotating to vary the point at which said limit stop contacts an axially relatively fixed part of the spindle assembly as the second portion is moved axially of the assembly.

References Cited by the Examiner
UNITED STATES PATENTS

| | | | |
|---|---|---|---|
| 2,142,021 | 12/1938 | Ernst et al. | 74—573 X |
| 2,164,900 | 7/1939 | Campbell | 74—573 X |

BROUGHTON G. DURHAM, *Primary Examiner.*